(12) United States Patent
Deur et al.

(10) Patent No.: US 7,437,698 B2
(45) Date of Patent: Oct. 14, 2008

(54) METHOD AND PROGRAM PRODUCT FOR PROTECTING INFORMATION IN EDA TOOL DESIGN VIEWS

(75) Inventors: Michael W. Deur, Leander, TX (US); John W. Woolsey, Round Rock, TX (US)

(73) Assignee: Freescale Semiconductor, Inc., Austin, TX (US)

(*) Notice: Subject to any disclaimer, the term of this patent is extended or adjusted under 35 U.S.C. 154(b) by 270 days.

(21) Appl. No.: 11/290,368

(22) Filed: Nov. 30, 2005

(65) Prior Publication Data

US 2007/0124717 A1    May 31, 2007

(51) Int. Cl.
*G06F 17/50* (2006.01)
(52) U.S. Cl. .......................................... 716/12; 716/11
(58) Field of Classification Search .............. 716/11–12
See application file for complete search history.

(56) References Cited

U.S. PATENT DOCUMENTS

| | | | |
|---|---|---|---|
| 5,937,190 A | 8/1999 | Gregory et al. | |
| 6,263,483 B1 | 7/2001 | Dupenloup | |
| 6,886,140 B2 | 4/2005 | Regnier | |
| 7,168,041 B1 * | 1/2007 | Durrill et al. | 715/700 |
| 2003/0004699 A1 | 1/2003 | Choi et al. | |
| 2005/0229128 A1 | 10/2005 | Sripada | |
| 2007/0050745 A1 * | 3/2007 | Dinter et al. | 716/11 |

* cited by examiner

*Primary Examiner*—Stacy A Whitmore
(74) *Attorney, Agent, or Firm*—Dillon & Yudell LLP

(57) ABSTRACT

Sensitive circuit design information in HDL Interface Logic Models such as module names and structures within certain EDA tool design views is eliminated by substituting selected instance and net names with unrelated unique identifiers prior to transferring the design views as part of a simulation model of a circuit design, and consequently avoiding unauthorized use of that information. The method for encoding signal names in different design views of an IC design includes providing a list of names contained in a plurality of design databases, changing each name in the list of names to a protected name, and substituting each changed name with an associated protected name in each design view database.

20 Claims, 7 Drawing Sheets

200

202 {
*NAME_MAP
*1 in_and1_a
*2 in_and1_b
*3 in_and1_c
*4 in_and2_a
*5 in_and2_b
*6 in_and2_c
*7 in_and3_a
*8 in_and3_b
*9 in_and3_c
*10 result
*11 clk
*12 and_gate_3
*13 and_gate_2
*14 and_gate_1
*15 and_gate_1Vinv_gate
*16 nor_gate
*17 and_gate_3Vnand_gate 204 {
*PORTS
*1 O *L 6.000000 *S 0.0 0.0
*2 O *L 6.000000 *S 0.0 0.0
*3 O *L 6.000000 *S 0.0 0.0

206 {
*D_NET *1 10.000000

*CONN
*I *19:B I *L 10.000000
*P *1 I

*CAP
1 *19:B 10.000000
2 *1 10.000000

*RES
1 *19:B *1 10.000000

*END

*D_NET *2 10.000000

*CONN
*I *19:A I *L 10.000000
*P *2 I

*CAP
1 *19:A 10.000000
2 *2 10.000000

*RES
1 *19:A *2 10.000000

*END

FIGURE 2

```
module top_example ( in_and1_a, in_and1_b, in_and1_c, in_and2_a, in_and2_b,
            in_and2_c, in_and3_a, in_and3_b, in_and3_c, result, clk );
input in_and1_a, in_and1_b, in_and1_c, in_and2_a,
            in_and2_b, in_and2_c, in_and3_a, in_and3_b, in_and3_c, clk;
output result;
```
— 302

```
wire  \and_gate_3/and_z_reg_reg ;
wire  \and_gate_3/nand_z ;
wire  \and_gate_3/nand_z_reg ;
wire  \and_gate_3/and_z_reg ;
wire  \and_gate_2/and_z_reg_reg ;
wire  \and_gate_2/nand_z ;
wire  \and_gate_2/nand_z_reg ;
wire  \and_gate_2/and_z_reg ;
wire  \and_gate_1/and_z_reg_reg ;
wire  \and_gate_1/nand_z ;
wire  \and_gate_1/inv_gate/and_z_reg ;
wire  \and_gate_1/nand_z_reg ;
```
— 304

```
NAND3x1 \and_gate_3/nand_gate ( .A(in_and3_b), .B(in_and3_a), .C(in_and3_c), .Z(\and_gate_3/
nand_z ));
NAND3x2 \and_gate_2/nand_gate ( .A(in_and2_b), .B(in_and2_a), .C(in_and2_c), .Z(\and_gate_2/
nand_z ));
NAND3x1 \and_gate_1/nand_gate ( .A(in_and1_b), .B(in_and1_a), .C(in_and1_c), .Z(\and_gate_1/
nand_z ));
DFFx1 \and_gate_3/delay_1 ( .D(\and_gate_3/nand_z ), .CK(clk), .Q(\and_gate_3/nand_z_reg ));
INVx8 \and_gate_3/inv_gate ( .A(\and_gate_3/nand_z_reg ), .Z(\and_gate_3/and_z_reg ));
DFFx1 \and_gate_3/delay_2 ( .D(\and_gate_3/and_z_reg ), .CK(clk), .Q(\and_gate_3/
and_z_reg_reg ));
DFFx1 \and_gate_2/delay_1 ( .D(\and_gate_2/nand_z ), .CK(clk), .Q(\and_gate_2/nand_z_reg ));
INVx1 \and_gate_2/inv_gate ( .A(\and_gate_2/nand_z_reg ), .Z(\and_gate_2/and_z_reg ));
DFFx1 \and_gate_2/delay_2 ( .D(\and_gate_2/and_z_reg ), .CK(clk), .Q(\and_gate_2/
and_z_reg_reg ));
DFFx1 \and_gate_1/delay_1 ( .D(\and_gate_1/nand_z ), .CK(clk), .Q(\and_gate_1/nand_z_reg ));
INVx1 \and_gate_1/inv_gate/inv_gate ( .A(\and_gate_1/nand_z_reg ), .Z(\and_gate_1/inv_gate
and_z_reg ));
DFFx1 \and_gate_1/delay_2 ( .D(\and_gate_1/inv_gate/and_z_reg ), .CK(clk),
 .Q(\and_gate_1/and_z_reg_reg ));
NOR3x1 nor_gate ( .A(\and_gate_2/and_z_reg_reg ), .B(\and_gate_3/and_z_reg_reg ), .C(\
and_gate_1/and_z_reg_reg ), .Z(result) ) ;
endmodule
```
— 306

FIGURE 3

[INSTANCE NAME]    [INPUT A]    [INPUT B]    [OUTPUT]
    402              404             406            408

FIGURE 4

```
        502          504
506~:%s!and_gate_3!JWW12JWW!g
    :%s!and_gate_2!JWW13JWW!g
    :%s!and_gate_1!JWW14JWW!g
    :%s!JWW14JWW/inv_gate!JWW15JWW!g
    :%s!nor_gate!JWW16JWW!g
508~:%s!JWW12JWW/nand_gate!JWW17JWW!g
    :%s!JWW13JWW/nand_gate!JWW18JWW!g
    :%s!JWW14JWW/nand_gate!JWW19JWW!g
    :%s!JWW12JWW/delay_1!JWW20JWW!g
    :%s!JWW12JWW/inv_gate!JWW21JWW!g
    :%s!JWW12JWW/delay_2!JWW22JWW!g
    :%s!JWW13JWW/delay_1!JWW23JWW!g
    :%s!JWW13JWW/inv_gate!JWW24JWW!g
    :%s!JWW13JWW/delay_2!JWW25JWW!g
    :%s!JWW14JWW/delay_1!JWW26JWW!g
    :%s!JWW15JWW/inv_gate!JWW27JWW!g
    :%s!JWW14JWW/delay_2!JWW28JWW!g
    :%s!\JWW12JWW/and_z_reg_reg!JWW29JWW!g
    :%s!\JWW12JWW/nand_z!JWW30JWW!g
    :%s!JWW30JWW_reg!JWW31JWW!g
    :%s!\JWW12JWW/and_z_reg!JWW32JWW!g
    :%s!\JWW13JWW/and_z_reg_reg!JWW33JWW!g
    :%s!\JWW13JWW/nand_z!JWW34JWW!g
    :%s!JWW34JWW_reg!JWW35JWW!g
    :%s!\JWW13JWW/and_z_reg!JWW36JWW!g
    :%s!\JWW14JWW/and_z_reg_reg!JWW37JWW!g
    :%s!\JWW14JWW/nand_z!JWW38JWW!g
    :%s!\JWW15JWW/and_z_reg!JWW39JWW!g
    :%s!JWW38JWW_reg!JWW40JWW!g
    :x
```
500

FIGURE 5

```
*NAME_MAP
*1 in_and1_a
*2 in_and1_b
*3 in_and1_c
*4 in_and2_a
*5 in_and2_b
*6 in_and2_c
*7 in_and3_a
*8 in_and3_b
*9 in_and3_c
*10 result
*11 clk
*12 JWW12JWW
*13 JWW13JWW
*14 JWW14JWW
*15 JWW15JWW
*16 JWW16JWW
*17 JWW17JWW

*PORTS
*1 O *L 6.000000 *S 0.0 0.0
*2 O *L 6.000000 *S 0.0 0.0
*3 O *L 6.000000 *S 0.0 0.0

*D_NET *1 10.000000
*CONN
*I *19:B I *L 10.000000
*P *1 I
*CAP
1 *19:B 10.000000
2 *1 10.000000
*RES
1 *19:B *1 10.000000
*END
*D_NET *2 10.000000
*CONN
*I *19:A I *L 10.000000
*P *2 I
*CAP
1 *19:A 10.000000
2 *2 10.000000
*RES
1 *19:A *2 10.000000
*END
```

FIGURE 6

```
module top_example ( in_and1_a, in_and1_b, in_and1_c, in_and2_a, in_and2_b,    ⟋ 700
                     in_and2_c, in_and3_a, in_and3_b, in_and3_c, result, clk );
  input in_and1_a, in_and1_b, in_and1_c, in_and2_a, in_and2_b, in_and2_c,
        in_and3_a, in_and3_b, in_and3_c, clk;
  output  result ;
```

702 {
```
  wire   \JWW29JWW ;
  wire   \JWW30JWW ;
  wire   \JWW31JWW ;
  wire   \JWW32JWW ;
  wire   \JWW33JWW ;
  wire   \JWW34JWW ;
  wire   \JWW35JWW ;
  wire   \JWW36JWW ;
  wire   \JWW37JWW ;
  wire   \JWW38JWW ;
  wire   \JWW39JWW ;
  wire   \JWW40JWW ;
```

704 {
```
  NAND3x1 \JWW17JWW ( .A(in_and3_b), .B(in_and3_a), .C(in_and3_c), .Z(\JWW30JWW ));
  NAND3x2 \JWW18JWW ( .A(in_and2_b), .B(in_and2_a), .C(in_and2_c), .Z(\JWW34JWW ));
  NAND3x1 \JWW19JWW ( .A(in_and1_b), .B(in_and1_a), .C(in_and1_c), .Z(\JWW38JWW ));
  DFFx1 \JWW20JWW ( .D(\JWW30JWW ), .CK(clk), .Q(\JWW31JWW ));
  INVx8 \JWW21JWW ( .A(\JWW31JWW ),.Z(\JWW32JWW ));
  DFFx1 \JWW22JWW ( .D(\JWW32JWW ), .CK(clk), .Q(\JWW29JWW ));
  DFFx1 \JWW23JWW ( .D(\JWW34JWW ), .CK(clk), .Q(\JWW35JWW ));
  INVx1 \JWW24JWW ( .A(\JWW35JWW ), .Z(\JWW36JWW ));
  DFFx1 \JWW25JWW ( .D(\JWW36JWW ), .CK(clk), .Q(\JWW33JWW ));
  DFFx1 \JWW26JWW ( .D(\JWW38JWW ), .CK(clk), .Q(\JWW40JWW ));
  INVx1 \JWW27JWW ( .A(\JWW40JWW ), .Z(\JWW39JWW ));
  DFFx1 \JWW28JWW ( .D(\JWW39JWW ), .CK(clk), .Q(\JWW37JWW ));
  NOR3x1 JWW16JWW ( .A(\JWW33JWW ), .B(\JWW29JWW ), .C(\JWW37JWW ), .Z(result) ) ;
endmodule
```

FIGURE 7

METHOD AND PROGRAM PRODUCT FOR PROTECTING INFORMATION IN EDA TOOL DESIGN VIEWS

BACKGROUND OF THE INVENTION

1. Field of the Invention

The present invention relates generally to the field of computer aided design for digital circuits, and particularly to protecting design information contained in electronic design automation (EDA) models.

2. Description of the Related Art

Modern advances in silicon technology such as multi-layer deep sub-micron complimentary metal-oxide semiconductor (CMOS) technology are responsible for allowing larger and more complex designs to be formed on a single chip, and hence enabling entire "system-on-a-chip" (SOC) designs to be placed on the same silicon substrate. These complex designs may incorporate, for example, one or more processor components, a digital signal processing (DSP) component, memory, several communications interfaces, and a graphics support component.

The advent of SOC design has the electronic systems industry shifting toward a new design paradigm based on the use of preexisting circuit blocks or "cores." Under this paradigm, systems are assembled by integrating one or more preexisting circuit blocks on the same silicon substrate. It is more efficient and practical for IC designers to incorporate components already developed rather than redesigning all the necessary hardware with each new IC design. It has naturally followed from this shift for different chip design vendors to supply preexisting circuit blocks to a system-level integrator or manufacturer developing a system-on-a-chip (SOC), and often these cores involve intellectual property (IP) owned by such vendors or groups other than the IC integrator.

As market demands continue to push electronic system manufacturers to develop systems more rapidly and efficiently, it is useful for the electronic system integrators or manufacturers to receive design models of a core to permit simulation and design integration of the SOC. An IC design simulation model allows an IC designer to know whether one component will work with another component to achieve the designer's needs. As the complexity of designs and methodologies increase, more and more detail and visibility into the core design is required to permit usability and integration. Unfortunately, the more accurate and detailed the model transferred to an SOC integrator, the greater the risk of misuse such as theft and unauthorized manipulation of those designs.

Core designs and models are relatively easy to copy, forge and re-design because they physically exist as data or code on storage devices. Moreover, the increased efficiency brought about by the existence of cores also provides an incentive for unauthorized use, re-use, transfer or sale of these items. As a consequence, while the complexity of designs and methodologies require transferring a significant amount of information to permit usability of the core by a SOC designer, it is becoming more important that efforts be taken to protect the IP transferred to customers, vendors and third parties participating in the SOC design.

Because the simulation model provides such valuable insight into the operation and capability of the design, those who own the IP in the design typically do not disclose the simulation model without carefully drafted legal agreements between the collaborating parties. Negotiating such agreements takes time and costs money for all parties. If a SOC designer wants to test out a design or idea, then procuring such agreements is a significant detriment to rapid, efficient and cost-effective design development. Moreover, by themselves, such legal means are of limited use because detection of illegal copying, forging, transfer or reuse of proprietary cores is difficult. It can be extremely challenging to determine whether a core was illegally acquired by a particular user or what sensitive information within a circuit design has been procured from its electronic form. Providers of cores are therefore in need of an effective method of protecting their designs so that they are not deprived of the benefits of the resources spent on design, development and procurement of cores.

BRIEF DESCRIPTION OF THE DRAWINGS

This invention is described in a preferred embodiment in the following description with reference to the drawings, in which like numbers represent the same or similar elements, as follows:

FIG. 2 is an example of a flat gate-level SPEF.

FIG. 3 shows an example of a module or a core design in a Verilog view.

FIG. 4 shows the an exemplary format of the Instance Names.

FIG. 5 shows a mapping of the replacement scheme performed by the design protection system, in accordance with a preferred embodiment of the present invention.

FIG. 6 shows an example of a protected SPEF, in accordance with a preferred embodiment of the present invention.

FIG. 7 shows a protected Verilog, in accordance with a preferred embodiment of the present invention.

Figure 1:
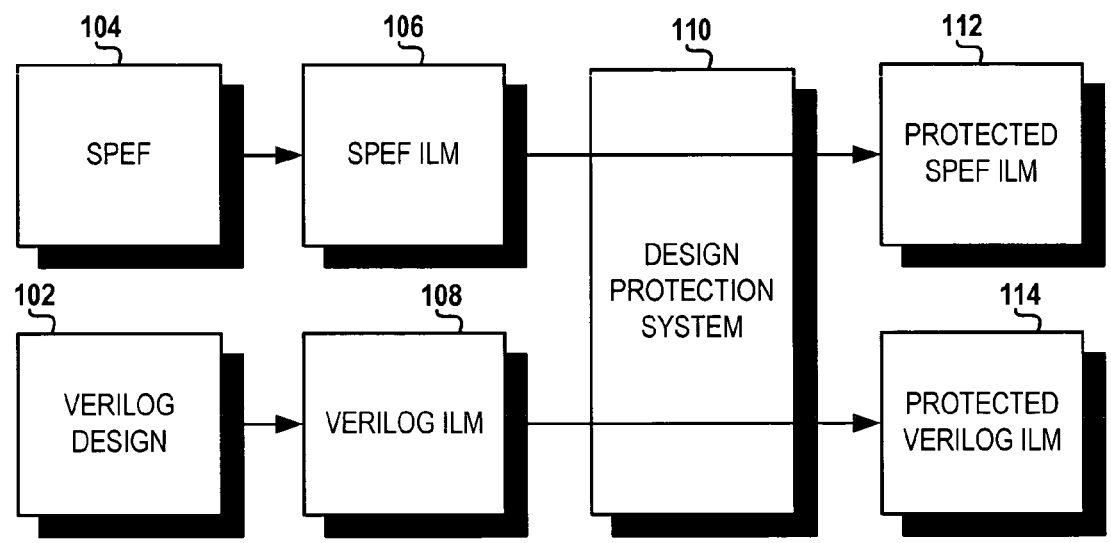
FIG. 1 is a block diagram of one embodiment of the present invention.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, it will be apparent to those of ordinary skill in the art that any manner of representing an IC design or a simulation model of an IC design using a hardware description language (HDL) representation or other symbolic representation is considered within the scope of the present invention.

In one or more embodiments as described herein, a method and program product for protecting sensitive circuit design information being transferred as part of a simulation model of a circuit design and consequently avoiding unauthorized use of that information is provided, wherein sensitive information such as module names and structures are within certain EDA tool design views. In this way, the method and system of the present invention enables a SOC designer to use a simulation model of a core design to determine if the operation of the core and components of the simulation model satisfy the designer's needs without permitting access to confidential information contained within the model. This alleviates, in part, reliance on confidentiality agreements between the SOC designer (or company) and IP owner to protect sensitive core design information that might otherwise be embodied in the simulation model.

Virtual component blocks are typically generated as part of a design process which can involve a number of steps, depending upon the level of abstraction desired for the particular circuit design. Chip designers often use electronic design automation (EDA) software tools to assist in the design process, and to allow simulation of a chip design prior to prototyping or production. Chip design using EDA software tools generally involves an iterative process whereby the chip design is gradually perfected. Typically, the chip designer builds up a circuit by inputting information at a computer workstation generally having high quality graphic capability so as to display portions of the circuit design as needed. A top-down design methodology is commonly employed using hardware description languages (HDLs), such as Verilog or VHDL, for example, by which the designer creates an integrated circuit by hierarchically defining functional components of the circuit, and then decomposing each component into smaller and smaller components.

The various components of an integrated circuit are initially defined by their functional operations and relevant inputs and outputs. During these design states, the designer generally structures the circuit using considerable hierarchical information, and has typically provided substantial regularity in the design. The design of a digital circuit can be represented or specified in different ways within the memory of a computer system. Each type of digital circuit representation is called a view. Different views contain different amounts and types of information regarding the structure of a circuit. Views which contain more information regarding the structure of the circuit require more of the computer's memory and require more of the computer's time to construct and manipulate.

From the HDL or other high level description, the actual logic cell implementation is typically determined by logic synthesis, which converts the functional description of the circuit into a specific circuit implementation. The logic cells are then "placed" (i.e., given specific coordinate locations in the circuit layout) and "routed" (i.e., wired or connected together according to the designer's circuit definitions). The placement and routing software routines generally accept as their input a flattened netlist that has been generated by the logic synthesis process. This flattened or hierarchical netlist identifies the specific logic cell instances from a target standard cell library, and describes the specific cell-to-cell connectivity.

An IC chip comprises cells and connections between the cells formed on a surface of a semiconductor substrate. A cell is a group of one or more circuit elements such as transistors, capacitors and other basic circuit elements grouped to perform a function. The IC may include a large number of cells and require complex connections between the cells. Each of the cells of an IC may have one or more pins, each of which, in turn, may be connected to one or more other pins of the IC by wires. The wires connecting the pin to the IC are also formed on the surface of the chip.

A net is a set of two or more interconnected pins and wires, thereby connecting the logic circuits having pins. Because a typical chip has thousands, tens of thousands or hundreds of thousands of pins that must be connected in various combinations, the chip also includes definitions of thousands, tens of thousands, or hundreds of thousands of "nets", or connections of sets of pins. The number of nets for a chip is typically of the same order as the order of the number of cells on that chip. Commonly, a majority of the nets include only two pins to be connected; however, many nets comprise three or more pins. Some nets may include hundreds or tens of thousands of pins to be connected.

An IC model is a set of interconnected circuit cells and nets typically represented in a HDL, and is sometimes interchangeably referred to herein as a module, core, intellectual property (IP), IP block, block, or component. A core is an electronic design implementable in hardware, typically specified in HDL, and also typically represented in a top-level netlist. A "netlist" is a list of nets ("Net Names") including names of connected pins or list of cells ("Instance Names") including names of nets that connect to pins of cells. Top-level RTL is synthesized to generate a gate-level netlist at a lower level of abstraction. After the synthesis of the design, the gate-level netlist is verified, the layout of the circuit is determined, and the IC is fabricated.

Today, the design of most digital integrated circuits (IC's) is a highly structured process based on an HDL (Hardware Description Language) methodology. The HDL methodology begins with the IC being specified by a specification document. Then, the IC specification is written to a high-level HDL code at a level of design abstraction referred to as the Register Transfer Language (RTL). RTL code describes circuits as a collection of registers, Boolean equations, and control logic such as "if-then-else" statements as well as complex event sequences. RTL code is typically implemented using a HDL language such as Verilog-HDL ("Verilog") or VHDL at the RTL level of abstraction, where the IC design is specified by describing the operations that are performed on data as it flows between circuit inputs, outputs and clocked registers. At the RTL level, designers must make all key design decisions such as design hierarchy and partitioning, clocking scheme, reset scheme, and locations of registers. All those decisions are contained and reflected in the RTL code. The RTL code is generally technology independent, as well as independent from design tools.

The IC design, as expressed by the RTL code, is then synthesized to generate a gate-level description or a netlist. Synthesis is the step taken to translate the architectural and functional descriptions of the design, represented by RTL code, to a lower level of representation of the design such as a logic-level and gate-level descriptions. The IC design specification and RTL code are generally technology independent. That is, the specification and the RTL code do not generally specify the exact gates or logic devices to be used to implement the design. The gate-level description of the IC design can be technology dependent. This is because, during the synthesis process, the synthesis tool may use a given technology library to map the technology independent RTL code into a technology-dependent gate-level netlist. However, a netlist may be generic or technology specific. A generic netlist is a netlist created from RTL code that has not been correlated with a technology-specific library of cells. A technology-specific netlist or a map netlist is a netlist created after an IC design has been mapped to a particular technology-specific library of cells.

The embodiments of the invention as described herein are applicable to a wide variety of virtual component blocks, whether they relate to system level macros, megacells, or embedded software "cores" used in system chip design. Virtual component blocks can generally be categorized according to their "firmness" as far as level of abstraction in the design stage. Virtual component blocks may, for example, be classified in one of three firmness categories: "soft," "firm," and "hard." The category of firmness characterizes the development stage, on the spectrum from functional specifications to a particular fabrication process.

"Soft" virtual component blocks are typically delivered to a SOC integrator in the form of a synthesizable hardware description language (such as, for example, VHDL or Verilog). Soft virtual components are highly flexible and may be generic and configurable. "Firm" virtual component blocks are largely structural-type models optimized for a generic technology. The level of detail of a firm virtual component block may range, for example, from a circuit design in which region placement of RTL sub-blocks is specified, via relatively placed data paths, to circuit design having a fully placed netlist. Firm virtual component blocks generally do not include routing and are portable across target technologies. "Hard" virtual components are mapped to a specific technology, and are generally optimized for power, size and performance in the target technology. Examples of hard virtual components may include a custom physical layout, or a netlist which is fully placed, routed and optimized for a given technology. Hard virtual component blocks are process or vendor specific, and usually expressed in a standard design language such as GDSII. A user generally is given access to a high level behavioral model and full physical/timing models along with the GDSII file in order to effectively use a hard virtual component block.

To simplify the tasks of design and analysis of a SOC, a complex design can be divided into blocks, i.e. any user- or system-defined hierarchy within a chip. At this point, the blocks can be replaced with interface models. Advantageously, such models can provide a compact means of exchanging the interface information for the blocks with a SOC integrator of the block, for example. The use of interface models in place of the full gate-level netlist for a block or core is key to improving performance and capacity associated with a chip-level analysis and simulation, particularly for complex designs whose gate counts exceeds five million gates. Moreover, such interface logic models permit the chip designer to preserve and protect the internal gate level design not required to be transferred with the interface logic model (ILM).

Automatic model generation can include the use of ILMs. ILMs discard the netlist, constraints, and back-annotation associated with internal register-to-register paths on a design, thereby offering significant runtime and performance improvements without sacrificing accuracy. Moreover, an ILM contains only interface logic of the original netlist. For example, logic that is only contained in register-to-register paths on a block is not placed in an ILM. The ILM includes cells (i.e. combination of logic and associated nets (called interface nets herein)) contained in a timing path that starts at an input port and ends at either an edge-triggered register (i.e. sequential logic) or an output port. If a transparent latch is encountered in such a timing path, then it is treated as combinational logic and path tracing continues through the latch until an edge-triggered register or output port is encountered.

An ILM can be used as a simulation model representation of the interface timing of the design. The ILM model can be generated from a design Verilog netlist and appropriate parasitic information. The ILM model of a component enables a detailed understanding and exploration of how that component operates and interacts with other components with respect to timing.

With reference now to the figures, and in particular with reference to FIG. 1, there is shown a block diagram of one embodiment of the present invention. IC design information (Verilog design) 102 is implemented in Verilog. IC design parasitic information (SPEF) 104 is associated with IC design information 102 and is in the Standard Parasitic Exchange Format (SPEF). Together, Verilog design 102 and SPEF 104 provide an important set of design information for a core or design block. Using standard EDA tools, SPEF 104 can be converted into an ILM 106, and Verilog design 102 can be converted into Verilog ILM 108. When generating an ILM, the EDA tool formats a flat gate-level netlist, as sometimes used by EDA tools for circuit simulation, timing verification and circuit placement and routing. Each of the SPEF ILM 106 and Verilog ILM 108 represent model views of the circuit design. As will be appreciated, each model view contains confidential simulation information that may provide insight into the operation and capability of the module.

FIG. 2 is an example of a flat gate-level SPEF. Netlist 200 contains name map 202, port parasitic information 204 and net connections and parasitic information 206.

FIG. 3 shows an example of a module or a core design in a Verilog view. Flat gate-level netlist 300 defines each "Instance Name," each "Net Name," and the hierarchical association between the Instance Names and Net Names. Interfaces 302 identify nets that connect to the inputs and outputs at the top level of the module. Net Names 304 identify each instance of a net that does not connect to an input or output at the top level of the module. Instance Names 306 identify each instance of an interface cell in the view. FIG. 4 shows the format of the Instance Names 306 as being identified by an instance name 402, a plurality of inputs 404, 406 (or more) and an output 408.

Referring back to FIG. 1, design protection system 110 shields disclosure of the proprietary portions of a simulation model, core and/or components to an external designer, while still giving the designer an understanding about whether or not the components, core or model meet design goals. In accordance with a preferred embodiment, design protection system 110 redefines instance names and net names and possibly the associated hierarchical information contained in the IC models to thereby protect the confidential information. Design protection system 110 redefines specific data across all design views in a consistent manner. A first view of the design is encoded by using a cipher to re-define certain instance names and net names within the view. When an instance name, net name or hierarchical association in the flat netlist identifies full logic paths, these are replaced with a single unique identifier for that instance or net. Then, related complimentary views are encoded exactly the same way to maintain consistency across the views.

In a preferred embodiment, a script within design protection system 110 generates protected SPEF ILM 112 and protected Verilog ILM 114 stripped of some or all sensitive or confidential information, but still permitting third party users to have full interaction with the models. Protected SPEF ILM 112 and protected Verilog ILM 114 result in simulations of the core in a format fully compatible with standard EDA tools.

FIG. 5 shows a mapping of the replacement scheme performed by the script in design protection system 110 for encoding the instance names, net names and hierarchical associations found in each of the views 102, 104 or ILMs 106, 108, in accordance with a preferred embodiment of the present invention. For purposes of description, design protection system 110 is described protecting ILMs 106, 108 (considered derived from exemplary views 200, 300 for purposes of illustration), however, design protection system 110 is operable to protect most any design views, including views 102, 104 for example. Each line of the mapping key 500 has an identifier 502 specifying an instance name within SPEF 104 (defined as between the first two "!") and an encoded identifier 504 (defined as between the second and third "!") that replaces the identifier 502. For example, the instance name 502 in line 506 (i.e., "and_gate__3" found at line "*12" of name map 202) is replaced with unique identifier 504 shown in line 506 (i.e., "JWW12JWW"). In this example, the encoded identifier 504 has been created by identifying the line in SPEF ILM 106 (after conversion from SPEF 104) where the instance name is identified and prepending and appending it with pre-selected letters. It will be appreciated by those skilled in the art that any naming or encoding scheme can be used, so long as each instance name, net name and hierarchical association in the netlist is given a unique and un-shared identifier. Mapping key 500 also provides an encoding of a net name using both encoded instance names and unencoded instance names. For example, as shown in FIG. 5 at line 508, the unique identifier "JWW17JWW" is created to identify the net connecting the previously re-named instance "JWW12JWW" and the cell "nand_gate."

In a preferred embodiment, design protection system 110 is implemented by a script that scans SPEF ILM 106 for a name map (derived from name map 202 in SPEF 200) to identify instance names and net names to be encoded. From the scan, design protection system 110 generates an encoding map 500 to uniquely identify each identified name using nomenclature unrelated to the names or other confidential information contained in the netlist. Design protection system 110 then generates a protected SPEF ILM 112 as a fully functional ILM design view but having selected sensitive or confidential information stripped from the netlist.

FIG. 6 shows an example of a protected SPEF, in accordance with a preferred embodiment of the present invention. In this example, lines "*12"-"*17" of name map 202 in the example of FIG. 2 have been determined to be confidential information and have been encoded using mapping key 500 into unique codes 602 to generate protected SPEF 600.

Design protection system 110 then proceeds to protect all other associated design views of the core design using the same mapping key 500. In a preferred embodiment, design protection system 110 generates protected Verilog ILM 114 from Verilog ILM 108 using mapping key 500.

An example of a protected Verilog file generated by applying mapping key 500 to Verilog 300, implemented as HDL netlist 700, is shown in FIG. 7. Nets 304 in Verilog 300 have been encoded into uniquely named connections shown as protected net names 702. Similarly, instance names 306 have been encoded into protected instance names 704 according to mapping key 500. For example, the first "NAND3×1" of instance names 306 has been encoded into the first protected instance name (of 704) using the unassociated instance name "JWW17JWW" and a unique identified output "JWW30JWW."

Figure 8:
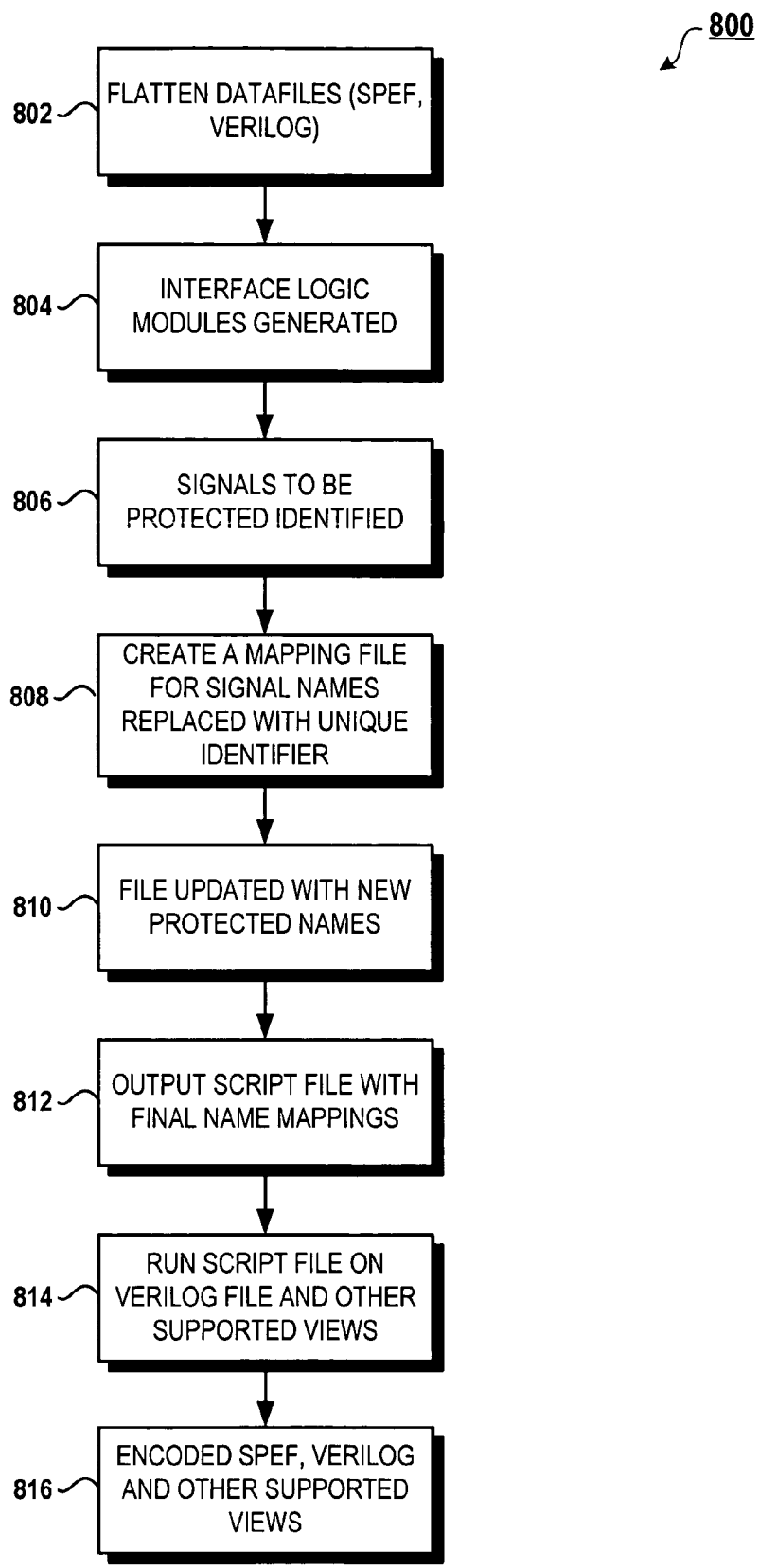
FIG. 8 shows a flow diagram of a process for protecting confidential information in design views of an EDA tool, in accordance with a preferred embodiment of the present invention.

With referenced now to FIG. 8, there is shown a flow diagram of a process for protecting confidential information in design views of an EDA tool, in accordance with a preferred embodiment of the present invention. Process 800 begins at step 802 where HDL code describing an IC design is flattened to remove hierarchical structure. For example, when protecting files to be transferred to a third party for simulation purposes, the SPEF and Verilog HDL files are flattened. The process then proceeds to step 804 where ILM models are generated. The process then proceeds to step 806 where signal names to be protected are identified. Here the process would parse the SPEF file to determine the number and location of signal names to remain or to be renamed in the SPEF file. For example, the SPEF file would be parsed to determine the number and location of module ports so that they are retained in their original form.

Thereafter, the process proceeds to step 808 where a mapping file associating signal names with protected signal names is created by mapping selected signal names to unique identifiers unrelated to the original signal names but uniquely identifying each signal name to be distinguished from the others. Signal names contained within port names are not mapped or replaced in a preferred embodiment. The process then proceeds to step 810, where the SPEF file is encoded with the protected signal names by scanning the file for instances of the original signal names and replacing them with their mapped protected names. Thereafter, the process proceeds to step 812 where a script file is generated containing code for mapping signal names to their unique protected signal names. Thereafter, the process proceeds to step 814 where the script file is executed on Verilog design files and other supporting design views of the IC containing the same signal names as the first file. When run, the script performs steps 806, 808 and 810 on the subject design view file to protect each instance of the selected signal names by replacing them with their unique mapped protected signal names. The process ends at step 816 by outputting encoded SPEF, Verilog and other supported design views in a protected format that hides module names and structures, while still retaining consistency between each design view and providing complete usability in EDA tools by third party recipients of the design views.

As will be appreciated, the preferred embodiment of the present invention allows for multiple IC design views to be filtered of confidential information in an efficient manner to present protected design views without loss of necessary information to permit utilization by standard EDA tools across the multiple views. Because encoding protected design views is performed using a mapping key, the original designer can easily translate comments or technical issues from the user of the protected file design view. This is important in order to support customers interacting with protected design views on many issues or questions regarding technical design.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A method comprising:
   scanning a first view of an IC design for instance names and net names that identify one or more logic path within the IC design;
   mapping each of one or more names found from scanning to an associated unique identifier dissimilar to its associated name;
   replacing, in the first view, one or more occurrences of a mapped name with its associated unique identifier to generate a first protected view of the IC design such that one or more logic path in the IC design is not disclosed in the first protected view;
   replacing, in a second or more views of the IC design, one or more occurrences of the mapped name with its associated unique identifier to generate a second protected view of the IC design such that one or more logic path in the IC design is not disclosed in the second protected view.

2. The method of claim 1, wherein the one or more names are selected from among instance names and net names in the first view.

3. The method of claim 1, wherein each name represents a hierarchical association between one or more instance names and one or more net names.

4. The method of claim 1, wherein the first view is an interface logic model.

5. The method of claim 1, wherein the first and second views are netlists.

6. The method of claim 1, wherein the first and second views are written in a hardware description language.

7. The method of claim 1, wherein the second view is coded in Verilog.

8. The method of claim 1, wherein the first view is formatted in a standard parasitic exchange format.

9. An article of manufacture comprising a machine-readable medium including program logic embedded therein for performing the steps of claim 1.

10. A system comprising means for performing the steps of claim 1.

11. A method for encoding signal names in a plurality of databases containing different information, comprising:
    providing a list of names contained in a plurality of databases, wherein each database of the plurality of databases comprises different information related to an IC design;
    changing each instance name and net name that identify one or more logic path within the IC design in the list of names to a protected name such that one or more logic path in the IC design is not disclosed; and
    substituting each changed name with an associated protected name in each database of the plurality of databases such that one or more logic path in the IC design is not disclosed in any database of the plurality of databases.

12. The method of claim 11, wherein the list of names contain instance names and net names.

13. The method of claim 11, wherein one or more names in the list of names represents a hierarchical association between one or more instance names and one or more net names.

14. The method of claim 11, wherein the plurality of databases include interface logic models.

15. The method of claim 11, wherein plurality of databases include netlists.

16. The method of claim 11, wherein the plurality of databases are written in a hardware description language.

17. The method of claim 11, wherein at least one of the databases of the plurality of databases is formaffed in a standard parasitic exchange format.

18. The method of claim 11, wherein at least one of the plurality of databases is coded in Verilog.

19. An article of manufacture comprising a machine-readable medium including program logic embedded therein for performing the steps of claim 11.

20. A system comprising means for performing the steps of claim 11.

* * * * *